Patented Feb. 8, 1938

2,107,284

UNITED STATES PATENT OFFICE 2,107,284

METHOD AND PRODUCT FOR TREATING GLASS WOOL

Hugh M. Bone and Robert C. Williams, Columbus, Ohio, assignors, by mesne assignments, to Owens-Illinois Glass Company, Toledo, Ohio, a corporation of Ohio No Drawing. Application February 20, 1936, Serial No. 64,938

5 Claims. (Cl. 87—9)

This invention relates to an improved oil-in-water emulsion for application to the surfaces of glass wool fibers by which the fibers are lubricated, rendered more effective for use as thermal insulation and in filtering capacities, and breakage of the individual fibers during handling of the wool minimized. The present invention constitutes a continuation-in-part of our prior co-pending application, Serial No. 737,637, filed July 30, 1934.

The practice of applying hydrocarbon oils to the fibers of siliceous wools used for insulating and filtering purposes is a well established one with recognized benefits. In the protection of glass wool fibers by the use of such coatings, best results are obtained by applying the coating material immediately following the formation of the glass wool and while the latter is in a heated state. At this time there exists considerable relative movement between adjoining and contacting fibers which, if not lubricated, results in seizure or frictional inter-locking between the contacting fibers with resulting increased breakage. However, since glass wool at the time of its formation possesses a relatively high temperature, a fire hazard is created if the treating material, having a hydrocarbon oil as its major ingredient, is directly applied to the heated glass wool. Therefore, such treating materials have been applied to the wool after cooling to temperatures below the combustion point of the coating materials, so that the glass fibers are unprotected during and immediately after primary formative stages. Moreover, the cost of such treatment with a lubricant comprising 90% to 100% of hydrocarbon oil is an item of considerable importance in the protection of siliceous wools even though the lubricant be sprayed on the wool fibers in relatively small quantities.

It is therefore one of the primary objects of the present invention to provide an improved lubricating emulsion of relatively low cost and capable of being applied to the glass wool when the latter is in a heated condition without fire risk.

Another object of the invention is the provision of an economical lubricating emulsion for glass wool which at the time of application thereof to the wool fibers comprises an oil-in-water emulsion wherein water in the continuous phase is the predominating ingredient and wherein the emulsion contains in colloidal suspension an ammonium soap, so that when the emulsion is applied to the heated surfaces of the wool fibers, the water and other associated low boiling point ingredients are volatilized or evaporated, leaving upon the cooled surfaces of the fibers a lubricating film or deposit of the fatty acid of an ammonium soap having water-repelling and lubricating characteristics.

A further object of the invention resides in incorporating in the emulsion an ammonium salt by which objectionable alkalies associated with the glass wool may be neutralized without, however, detrimentally affecting the stability of the applied emulsion.

In accordance with the present invention, emulsion compositions are applied to the glass wool and when so applied are diluted with water so that said emulsions possess a water content varying from 85% to 95%, the balance being the oil phase together with the emulsifying agents.

A typical example of an emulsion suitable for the uses specified comprises the following:

| | Per cent |
|---|---|
| Stearic acid | 18.5 |
| Light mineral oil | 24.5 |
| Crude scale paraffin wax | 9.8 |
| Commercial concentrated 26° Bé. aqua ammonia | 4.0 |
| Water | 43.2 |
| | 100.0 |

Another example of our improved emulsion may consist in the following:

| | Per cent |
|---|---|
| Bright stock hydrocarbon oil, viscosity approximately 160 sec. at 210° F | 40.0 |
| Oleic acid | 14.0 |
| Commercial 26° Bé. aqua ammonia | 3.5 |
| Water | 42.5 |
| | 100.0 |

At the time of application, the above composition may be further diluted with about 8 to 9 parts of water and is then ready for use.

The following composition in concentrated form may also be employed to advantage and leaves a coating of a more solid nature on the wool fibers:

|  | Per cent |
|---|---|
| Oleic acid | 14.0 |
| Commercial 26° Bé. aqua ammonia | 3.5 |
| Bright stock hydrocarbon oil, viscosity approximately 160 sec. at 210° F | 20.0 |
| Crude scale paraffin wax | 20.0 |
| Water | 42.5 |
| | 100.0 |

Other permissible formulas are as follows:

|  | Per cent |
|---|---|
| Hydrocarbon oil (bright stock) | 40.0 |
| Oleic acid | 14.0 |
| Ammonia | 4.0 |
| Water | 41.5 |
| Zinc oxide | 0.5 |
| | 100.0 |

|  | Per cent |
|---|---|
| Hydrocarbon oil | 40.0 |
| Oleic acid | 12.6 |
| Stearic acid | 1.4 |
| Ammonia | 4.0 |
| Water | 41.5 |
| Zinc oxide | 0.5 |
| | 100.0 |

These compositions may also be suitably diluted with water prior to use. A light mineral oil may be substituted for the heavy bright stock lubricating oils, since a lighter bodied mineral oil and less paraffin wax may be preferred for certain forms of wool where the more adhesive heavy oil causes the wool to pack too tightly.

|  | Per cent |
|---|---|
| Oleic acid | 18.5 |
| 28° Bé. gravity paraffin oil | 24.5 |
| Crude scale paraffin wax | 9.8 |
| Commercial 26° Bé. aqua ammonia | 4.0 |
| Water | 43.2 |
| | 100.0 |

In these compositions, we do not limit ourselves to the employment of crude scale paraffin wax, as other well known waxes and wax-like substances may be substituted in lieu thereof.

Such an oil-in-water emulsion applied to glass wool acts apparently as a tempering agent, since the glass wool possesses a fairly high temperature at the time of application of the emulsion, imparting to the glass fibers an increased tensile strength.

While the same emulsion may be used upon glass wool employed for thermal insulation and also for filtration purposes, it is preferable to employ a more concentrated form when the glass wool is employed primarily in air conditioning equipment for dust catching and filtering purposes. Thus in the case of glass wool adapted for use as insulation, we preferably employ approximately 5% by weight of the finally diluted emulsion on the glass wool to be treated, whereas when the glass wool is employed as filter media, we preferably use about 30% by weight of the finally diluted emulsion.

After applying the emulsion for the purposes specified, the bulk of the water and other low boiling point ingredients evaporate or are evaporated. The amount of oil on the wool is so small (since a very dilute emulsion is used) that it will not propagate flame when an attempt is made to ignite it. No fire hazard exists during the process of application when an emulsion of the described types is used since the water content thereof is too high to permit of combustion.

The addition of ammonia to the emulsion imparts waterproofing or moisture repelling qualities to the applied coating on the glass fibers, this being particularly desirable in cases where the treated glass wool may be exposed to the elements during transportation or when installed as insulation between building walls. In lieu of ammonia, other volatilizable alkaline agents may be employed, such as methylamine or ethylamine or, again, other ammonium soaps may be utilized.

Most glass wool has associated with it an alkali, which is objectionable for certain uses. This alkali, presumably caustic soda, soda ash or both, is partially neutralized by the fatty acid (oleic acid) in the above emulsions when the wool is treated therewith. Since these emulsions are stabilized by alkaline ingredients (ammonia and ammonium soap), the addition of an excess of mineral acid to the emulsion for the purpose of counteracting the alkali on the wool fibers would break the emulsion and render it ineffective. Ammonium chloride or ammonium sulphate may, therefore, be added to the emulsion for the purpose of neutralizing the alkali on the glass wool successfully, since these salts are compatible with these alkaline emulsifying or stabilizing agents. It will be appreciated that an acid, such as hydrochloric could be added to an emulsion containing an excess of ammonia without breaking the emulsion if care were taken not to neutralize both the excess ammonia and the ammonia combined in the form of ammonium soap. The ammonium chloride would be, therefore, formed in the emulsion instead of being added as ammonium chloride.

This ammonium chloride type of neutralizing agent is used with the ammonia stabilized emulsions, since it appears at present that the waterproof type of coating is of the greater commercial importance. This type of emulsion employs ammonia rather than other commercial alkalies, caustic soda and potash. The amount of ammonium chloride used depends on the amount of alkali on the wool, satisfactory results having been obtained by using 4% to 5% of ammonium chloride in the finally diluted emulsion.

We claim:
1. An oil-in-water emulsion for application to glass wool to produce an oleaginous coating thereon comprising a hydrocarbon from about 20% to about 40%, a fatty acid from about 12.6% to 18.5%, a volatile alkaline agent in appreciable amount up to about 4%, and water.

2. An oil-in-water emulsion for producing a water-repelling oleaginous coating on the surfaces of glass wool fibers comprising: a normally liquid fatty acid in the approximate proportion from about 12.6% to about 18.5%, hydrocarbon in approximate proportion from about 20% to about 40%, an ammonium compound up to about 5%, and water, wherein water is the predominating ingredient.

3. As a new composition of matter, a stable emulsion for treating glass wool to produce an oleaginous coating thereon comprising:

|  | Per cent |
|---|---|
| Hydrocarbon oil (bright stock) 160 viscosity at 210° F | 40.0 |
| Oleic acid | 14.0 |
| 26° Bé. aqua ammonia, commercial concentrated | 3.5 |
| Water | 42.5 |

4. As a new composition of matter, a stable emulsion for treating glass wool to produce an oleaginous coating thereon comprising:

| | Per cent |
|---|---|
| Stearic acid | 18.5 |
| Light mineral oil | 24.5 |
| Paraffin wax | 9.8 |
| Ammonia | 4.0 |
| Water | 43.2 |

5. As a new composition of matter, a stable emulsion for treating glass wool to produce an oleaginous coating thereon comprising:

| | Per cent |
|---|---|
| Oleic acid | 14.0 |
| Commercial 26° Bé. aqua ammonia | 3.5 |
| Hydrocarbon oil | 20.0 |
| Paraffin wax | 20.0 |
| Water | 42.5 |

HUGH M. BONE.
ROBERT C. WILLIAMS.